United States Patent
Yang et al.

(10) Patent No.: US 9,001,297 B2
(45) Date of Patent: Apr. 7, 2015

(54) THIRD METAL LAYER FOR THIN FILM TRANSISTOR WITH REDUCED DEFECTS IN LIQUID CRYSTAL DISPLAY

(71) Applicant: Apple Inc., Cupertino, CA (US)

(72) Inventors: Byung Duk Yang, Cupertino, CA (US);
Kyung Wook Kim, Cupertino, CA (US);
Young Bae Park, Cupertino, CA (US);
Shih Chang Chang, Cupertino, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 155 days.

(21) Appl. No.: 13/752,612

(22) Filed: Jan. 29, 2013

(65) Prior Publication Data
US 2014/0211120 A1    Jul. 31, 2014

(51) Int. Cl.
G02F 1/1343    (2006.01)
G02F 1/1362    (2006.01)

(52) U.S. Cl.
CPC ................... *G02F 1/136286* (2013.01)

(58) Field of Classification Search
CPC .............. G02F 1/136227; G02F 1/133514;
G02F 1/133707; G02F 1/13345; G02F
1/134363; G02F 1/1368; G02F 1/1333;
G02F 1/1343; G02F 1/136286; G02F
2001/133357; G02F 2201/122; G02F
2201/123; G02F 2202/02; H01L 27/12;
H01L 27/1248; H01L 27/3244; H01L
27/3276; H01L 27/1214; H01L 51/5237;
H01L 51/5284; H01L 33/36
USPC ........... 349/138, 139, 158, 43, 106, 141, 143,
349/129, 187, 192, 42, 54, 110; 257/59, 72;
438/151, 128, 149
See application file for complete search history.

(56) References Cited

U.S. PATENT DOCUMENTS

| | | |
|---|---|---|
| 4,080,619 A | 3/1978 | Suzuki |
| 4,958,205 A | 9/1990 | Takeda et al. |
| 5,075,237 A | 12/1991 | Wu |
| 5,642,129 A | 6/1997 | Zavracky et al. |
| 5,668,613 A | 9/1997 | Kim et al. |
| 5,698,902 A | 12/1997 | Uehara et al. |
| 5,721,155 A | 2/1998 | Lee |
| 5,990,492 A | 11/1999 | Kim et al. |
| 5,994,721 A | 11/1999 | Zhong et al. |

(Continued)

FOREIGN PATENT DOCUMENTS

| | | |
|---|---|---|
| EP | 0376329 | 7/1990 |
| EP | 2048538 | 4/2009 |

(Continued)

*Primary Examiner* — Thoi Duong (57) ABSTRACT

A liquid crystal display (LCD) includes an array of pixels over a thin film transistor (TFT) substrate. The TFT substrate includes a TFT that has a first metal layer to form a gate electrode and a second metal layer to form a source electrode and a drain electrode for each pixel. The LCD also includes an organic insulation layer disposed over the TFT substrate, where the organic insulator layer has trenches on a top surface. The LCD further includes a third metal layer disposed over the organic insulation layer in the trenches, the trenches having a trench depth at least equal to the thickness of the third metal layer. The LCD also includes a passivation layer over the third metal layer, and a pixel electrode for each pixel over the passivation layer. The LCD further includes a polymer layer over the pixel electrode, and liquid molecules on the polymer layer.

22 Claims, 8 Drawing Sheets

(56) References Cited

U.S. PATENT DOCUMENTS

| | | |
|---|---|---|
| 6,246,179 B1 | 6/2001 | Yamada |
| 6,372,636 B1 | 4/2002 | Chooi et al. |
| 6,406,928 B1 | 6/2002 | Jen |
| 6,479,398 B1 | 11/2002 | Chen, Jr. |
| 6,509,614 B1 | 1/2003 | Shih |
| 6,525,342 B2 | 2/2003 | Amemiya |
| 6,548,960 B2 | 4/2003 | Inukai |
| 6,613,620 B2 | 9/2003 | Fujimoto et al. |
| 6,686,273 B2 | 2/2004 | Hsu et al. |
| 6,768,531 B2 | 7/2004 | Ochiai et al. |
| 6,812,637 B2 | 11/2004 | Cok et al. |
| 6,967,407 B2 | 11/2005 | Otani et al. |
| 7,030,553 B2 | 4/2006 | Winters et al. |
| 7,045,406 B2 | 5/2006 | Huotari et al. |
| 7,129,634 B2 | 10/2006 | Boroson et al. |
| 7,190,419 B2 | 3/2007 | Park |
| 7,199,518 B2 | 4/2007 | Couillard |
| 7,209,057 B2 | 4/2007 | Hashido et al. |
| 7,227,542 B2 | 6/2007 | Koyama |
| 7,402,468 B2 | 7/2008 | Park et al. |
| 7,419,858 B2 | 9/2008 | Schuele et al. |
| 7,510,891 B2 | 3/2009 | Chun et al. |
| 7,550,306 B2 | 6/2009 | Park et al. |
| 7,553,707 B2 | 6/2009 | Horino et al. |
| 7,563,669 B2 | 7/2009 | Chittipeddi et al. |
| 7,602,456 B2 | 10/2009 | Tanaka |
| 7,609,342 B2 | 10/2009 | Yang et al. |
| 7,671,939 B2 | 3/2010 | Araki et al. |
| 7,759,857 B2 | 7/2010 | Vaufrey et al. |
| 7,816,677 B2 | 10/2010 | Lee et al. |
| 7,843,130 B2 | 11/2010 | Shimizu et al. |
| 7,855,508 B2 | 12/2010 | Cok et al. |
| 7,919,918 B2 | 4/2011 | Kim |
| 7,952,104 B2 | 5/2011 | Leonardi et al. |
| 7,956,825 B2 | 6/2011 | Kane |
| 7,969,087 B2 | 6/2011 | Hwang et al. |
| 7,973,470 B2 | 7/2011 | Cok |
| 8,053,978 B2 | 11/2011 | Hwang et al. |
| 8,064,028 B2 | 11/2011 | Katayama et al. |
| 8,072,080 B2 | 12/2011 | Moriwaki |
| 8,089,429 B2 | 1/2012 | Yamashita et al. |
| 8,102,338 B2 | 1/2012 | Hwang et al. |
| 8,133,748 B2 | 3/2012 | Yamazaki et al. |
| 8,236,628 B2 | 8/2012 | Liu et al. |
| 8,278,162 B2 | 10/2012 | Akimoto et al. |
| 8,278,661 B2 | 10/2012 | Song |
| 8,294,147 B2 | 10/2012 | Yamazaki et al. |
| 8,297,991 B2 | 10/2012 | Adachi |
| 8,339,531 B2 | 12/2012 | Yamauchi |
| 8,363,197 B2 | 1/2013 | Matsuda et al. |
| 8,368,674 B2 | 2/2013 | Kim et al. |
| 8,377,762 B2 | 2/2013 | Eguchi et al. |
| 8,427,607 B2 | 4/2013 | Lee et al. |
| 8,455,872 B2 | 6/2013 | French |
| 8,471,256 B2 | 6/2013 | Yamazaki et al. |
| 8,508,562 B2 | 8/2013 | Akimoto et al. |
| 8,508,709 B2 | 8/2013 | Huang et al. |
| 8,552,655 B2 | 10/2013 | Ono |
| 8,568,877 B2 | 10/2013 | Ferrari et al. |
| 8,610,860 B2 | 12/2013 | Huang et al. |
| 8,692,743 B2 | 4/2014 | Tsai et al. |
| 8,859,947 B2 | 10/2014 | Adachi |
| 2003/0076282 A1 | 4/2003 | Ikeda et al. |
| 2007/0268229 A1 | 11/2007 | Kang et al. |
| 2008/0252202 A1 | 10/2008 | Li et al. |
| 2009/0102052 A1 | 4/2009 | Ryu |
| 2010/0156771 A1 | 6/2010 | Lee et al. |
| 2010/0245733 A1* | 9/2010 | Ono ........................ 349/106 |
| 2010/0330811 A1 | 12/2010 | Nagao |
| 2011/0012125 A1 | 1/2011 | Nicholas |
| 2011/0227850 A1 | 9/2011 | Oh et al. |
| 2012/0087460 A1 | 4/2012 | Moriwaki |
| 2012/0105495 A1 | 5/2012 | Choi |
| 2012/0119211 A1 | 5/2012 | Lin |
| 2012/0205658 A1 | 8/2012 | Yamazaki et al. |
| 2012/0248455 A1 | 10/2012 | Van Gestel |
| 2012/0268396 A1 | 10/2012 | Kim et al. |
| 2012/0287102 A1 | 11/2012 | Toyomura et al. |
| 2012/0299976 A1 | 11/2012 | Chen et al. |
| 2013/0027646 A1 | 1/2013 | Cho et al. |
| 2013/0069061 A1 | 3/2013 | Nakazawa |
| 2013/0161622 A1 | 6/2013 | Lee |
| 2013/0328053 A1 | 12/2013 | Roudbari et al. |
| 2013/0335658 A1 | 12/2013 | Huang et al. |
| 2013/0337596 A1 | 12/2013 | Hung et al. |
| 2014/0061656 A1 | 3/2014 | Yu et al. |
| 2014/0070225 A1 | 3/2014 | Yu et al. |
| 2014/0084292 A1 | 3/2014 | Hung et al. |
| 2014/0091390 A1 | 4/2014 | Hung et al. |
| 2014/0103349 A1 | 4/2014 | Yu et al. |
| 2014/0104527 A1 | 4/2014 | Yang et al. |
| 2014/0120657 A1 | 5/2014 | Hung et al. |
| 2014/0203245 A1 | 7/2014 | Gupta et al. |
| 2014/0204067 A1 | 7/2014 | Gupta |
| 2014/0225117 A1 | 8/2014 | Roudbari et al. |
| 2014/0252317 A1 | 9/2014 | Gupta et al. |

FOREIGN PATENT DOCUMENTS

| | | |
|---|---|---|
| JP | 2010056015 | 3/2010 |
| TW | 201142797 | 12/2011 |
| WO | WO 2011/030620 | 3/2011 |
| WO | WO 2011/151970 | 12/2011 |

\* cited by examiner

THIRD METAL LAYER FOR THIN FILM TRANSISTOR WITH REDUCED DEFECTS IN LIQUID CRYSTAL DISPLAY

TECHNICAL FIELD

Embodiments described herein generally relate to thin film transistor (TFT) used in a liquid crystal display (LCD). More specifically, certain embodiments relate to a TFT having a third metal layer associated with reduced defects in an LCD.

BACKGROUND

Liquid crystal displays (LCDs) generally display images by transmitting or blocking light through the action of liquid crystals. An LCD includes an array of pixels for displaying images. LCDs have been used in a variety of computing displays and devices, including notebook computers, desktop computers, tablet computing devices, mobile phones (including smart phones) automobile in-cabin displays, on appliances, as televisions, and so on. LCDs often use an active matrix to drive liquid crystals in a pixel region. In some LCDs, a thin-film transistor (TFT) is used as a switching element in the active matrix.

Certain LCDs operate in a fringe field switching (FFS) mode. FFS mode LCDs may have better aperture ratios and transmittances than in-plane switching (IPS) mode LCD devices. IPS LCDs generally use thin film transistor (TFT) technology to improve image quality. By contrast, in a FFS LCD, a common electrode and a pixel electrode are formed of transparent conductors, and the distance between the common electrode and the pixel electrode is maintained at a relatively narrow range to drive liquid crystal molecules by using a fringe field formed between the common electrode and the pixel electrode. FFS LCDs may deliver brighter picture and have better color consistency than IPS LCDs, and may deliver these qualities at relatively wide viewing angles.

Typically, display pixels are addressed in rows and columns, which may reduce the connection count from millions for each individual pixel to thousands, when compared to a display having pixels addressed only by rows and/or columns. The column and row wires attach to transistor switches; one transistor is present for each pixel. The one-way current passing characteristic of the transistor prevents the charge applied to the pixel from draining between refreshes of the display image.

Stability of the common electrode voltage ($V_{com}$) may become more important as the resolution of the LCD increases, since the $V_{com}$ voltage level directly affects the luminescence and luminescence uniformity of the LCD. For example, pixel coupling may cause a ripple in $V_{com}$ voltage, which in turn may cause a perceptible color shift in the display. For example, the display may have a greenish tint or hue.

Effective methods for stabilizing $V_{com}$ include decreasing parasitic coupling capacitances between a common electrode and a pixel electrode and reducing a resistance of the common electrode. The common electrode is normally formed of a transparent conductive material, such as indium-tin oxide (ITO). One way of reducing the resistance of the common electrode is to increase the ITO film thickness. Another way of reducing the resistance of the common electrode is to add a metal layer to the ITO film. The metal layer usually forms a gate electrode. Alternatively, the metal layer may also be formed by a different metal layer referred to as a "third metal layer," to decrease $V_{com}$ resistance and increase aperture ratio, where a gate electrode of the TFT is formed of a first metal layer and the source/drain electrodes of the TFT are formed of a second metal layer. However, the addition of the third metal layer may produce rubbing mura, which may impact performance of an LCD. Generally, "rubbing mura" is an unevenness or irregularity in alignment of liquid crystal molecules, which may cause uneven changes in luminance across the surface of the display.

Therefore, there remains a need for developing techniques for improving stability of the common electrode and producing a rubbing mura-free third metal layer in FFS TFT for LCDs.

SUMMARY

Embodiments described herein may take the form of an LCD with a third metal layer having an increased thickness on a common electrode, when compared to a conventional LCD. This may reduce a resistance of the common electrode and thus improve stability of the common electrode voltage. The common electrode is disposed over an organic insulation layer which includes trenches for placing the third metal layer. The trenches allow the third metal to be as thick as desired, which may improve the stability of the common electrode voltage, and thus may reduce color shift. Further, the trench depths generally ensure that a rubbing roller would not impact any surface irregularity, such as a bump, in the third metal region during manufacturing processes. Thus, the trench depth may be equal to or greater than the third metal thickness.

Rubbing processes that do not generate mura by rubbing a roller over the third metal may be referred to a "mura-free" rubbing process. The mura-free rubbing process helps produce trenches that align the liquid crystal molecules better than a conventional rubbing process that produces rubbing mura. The improved alignments of the liquid crystal molecules further help the display reduce light leakage and achieve a high contrast ratio. In some embodiments, the trenches may be formed by using a half-tone mask with a metal slit pattern, although other embodiments may use any suitable manufacturing process.

In one embodiment, a method is provided for fabricating a liquid crystal display having a array of pixels. The method includes depositing an organic insulation layer over a thin film transistor (TFT) substrate, which includes a plurality of TFTs to control the array of pixels. The TFT substrate includes a first metal layer to form a gate electrode and a second metal layer to form a source electrode and a drain electrode for each of the plurality of TFTs. The method also includes forming a plurality of trenches in the organic insulation layer by using a half tone mask, and depositing a third metal layer over the organic insulation in the trenches, the trenches being configured to have a trench depth at least equal to a thickness of the third metal layer. The method further includes disposing a passivation layer over the third metal layer, and forming a pixel electrode for each pixel over the passivation layer, the pixel electrode being connected to the drain electrode. The method also includes disposing a polymer layer over the pixel electrode, and aligning liquid molecules on the polymer layer. In a particular embodiment, the method further includes depositing a first conductive layer over the organic insulation layer to form a common electrode for the array of pixels; and depositing the third metal layer over the first conductive layer above the trenches. Alternatively, the method includes depositing the third metal layer over the organic insulation layer in the trenches; and depositing a first conductive layer over the third metal and the organic insulation layer to form a common electrode for the array of pixels.

In another embodiment, a liquid crystal display (LCD) includes an array of pixels over a thin film transistor (TFT) substrate, which includes a plurality of TFTs for the array of pixels. Each TFT having a first metal layer to form a gate electrode and a second metal layer to form a source electrode and a drain electrode for each pixel. The LCD also includes an organic insulation layer disposed over the TFT substrate, the organic insulator layer having a plurality of trenches on a top surface. The LCD further includes a third metal layer disposed over the organic insulation layer in the trenches, the trenches having a trench depth at least equal to the thickness of the third metal layer. The LCD also includes a passivation layer over the third metal layer, and a pixel electrode for each pixel over the passivation layer, the pixel electrode being coupled to the drain electrode. The LCD further includes a polymer layer over the pixel electrode, and liquid molecules on the polymer layer. In a particular embodiment, the method further includes depositing a first conductive layer over the organic insulation layer to form a common electrode for the array of pixels; and depositing the third metal layer over the first conductive layer above the trenches. Alternatively, the method includes depositing the third metal layer over the organic insulation layer in the trenches; and depositing a first conductive layer over the third metal and the organic insulation layer to form a common electrode for the array of pixels.

Additional embodiments and features are set forth in part in the description that follows, and in part will become apparent to those skilled in the art upon examination of the specification or may be learned by the practice of the embodiments discussed herein. A further understanding of the nature and advantages of certain embodiments may be realized by reference to the remaining portions of the specification and the drawings, which forms a part of this disclosure.

DETAILED DESCRIPTION

The present disclosure may be understood by reference to the following detailed description, taken in conjunction with the drawings as described below. It is noted that, for purposes of illustrative clarity, certain elements in various drawings may not be drawn to scale.

As previously mentioned, the addition of a third metal layer to a TFT, for use with one or more pixels of a display device, may be useful. Generally, a thickness of the third metal layer on the common electrode is normally restricted to 10 Å to 10,000 Å in a conventional LCD. This thickness is limited because, if the third metal line is thicker, it may be subjected to rubbing mura around during manufacturing processes. As one example, rubbing mura may be produced by a roller impacting the third metal during a rubbing process designed to help align liquid molecules on a thin polymer layer disposed over the TFT. The roller may have a texture on its surface, such as shallow trenches. The liquid molecules may have rod-like shapes. Therefore, the roller can align the liquid molecules in a direction defined by the shallow trenches on the roller surface. The alignment direction of the liquid crystal molecules is then defined by the direction of rubbing.

Figure 1A:
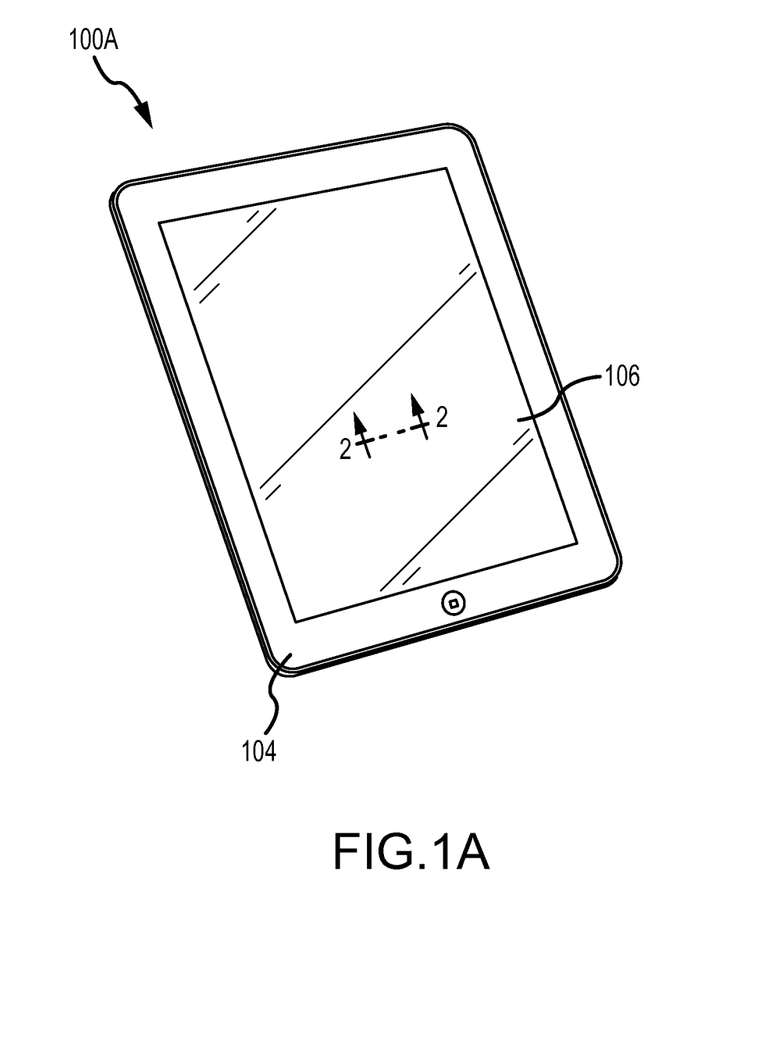
FIG. 1A illustrates a perspective view of a sample electronic device in accordance with embodiment of the present disclosure.

FIG. 1A illustrates a perspective view of a sample electronic device, such as a tablet computer, in accordance with embodiment of the present disclosure. The electronic device may include a touch screen display 100A enclosed by a housing 104. The touch screen display 100A incorporates a cover glass 106 and an LCD behind the cover glass 106, although alternative embodiments may employ an LCD instead of an organic light-emitting display (OLED). It should be appreciated that other embodiments may take a variety of forms, including: LCD computer monitors; display screens in phones; televisions; display screens in vehicles, display screens in appliances; information kiosks; automated teller machines; and so forth. Embodiments discussed herein may operate or be suitable for substantially any LCD screen, including LCD screens that lack any touch screen technology.

Figure 1B:
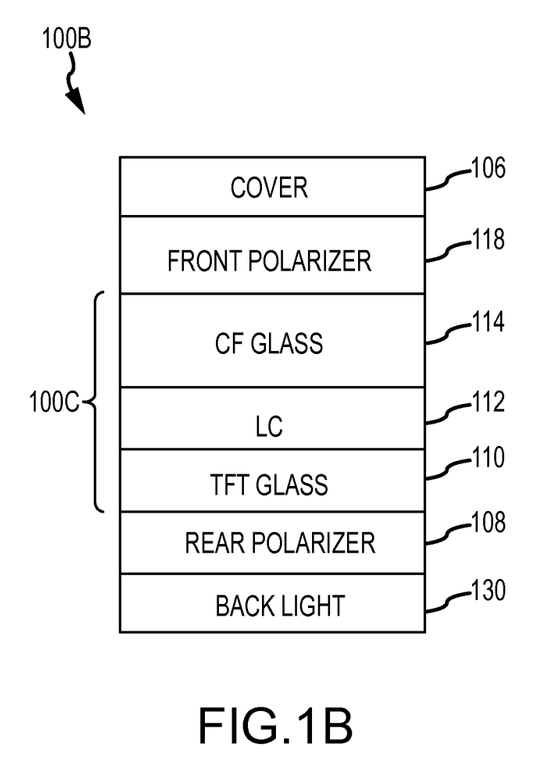
FIG. 1B illustrates a partial cross-sectional view of an LCD in accordance with embodiments of the present disclosure.

FIG. 1B illustrates a partial cross-sectional view of an LCD in accordance with certain embodiments of the present disclosure. It should be appreciated that the various layers and elements shown in FIG. 1B are not to scale, but instead are shown for illustrative purposes. Further, in some embodiments certain layers and/or elements may be omitted or may have their relative positions changed. In this example, LCD 100B includes a backlight 130, rear polarizer 108, a TFT glass 110, liquid molecules (LC) 112, and color filter glass 114. The LCD 100B also includes a front polarizer 118 and the cover 116. The liquid crystal layer 112 is arranged between the front and rear polarizers. The TFT glass 110 is arranged between the liquid crystal layer 112 and the rear polarizer 108. The color filter (CF) glass 114 may be arranged between the front polarizer 118 and the liquid crystal layer 112 to output light of different colors.

The backlight 130 is configured to provide white light to the rear polarizer 108. For example, the backlight 130 may include a blue LED emitting blue light and red and green phosphors that emit red and green light when excited by the blue light from the blue LED. When all emitted colors are mixed, a white back light may be produced. Alternatively, the backlight 130 may include a blue LED emitting blue light and a yellow phosphor that emit yellow light when excited by blue light from the blue LED, again resulting in a white back light upon mixing.

Each pixel of the LCD has a corresponding transistor or switch for controlling voltage applied to the liquid crystal. The liquid crystal layer 112 may include rod-shaped polymers that naturally form into thin layers with a natural alignment. The electrodes may be made of a transparent conductor, such as an indium-tin-oxide material (commonly referred to as "ITO"). The two polarizers 118 and 108 are set at right angles. Normally, the LCD 100B may be opaque. When a voltage is applied across the liquid crystal layer 112, the rod-shaped polymers align with the electric field and untwist. The voltage controls the light output from the front polarizer 118. For example, when a voltage is applied to the liquid crystal layer 112, the liquid crystal layer 112 rotates so that there is light output from the front polarizer 118.

Transistors in the TFT glass 110 may take up only a small fraction of the area of each pixel; the rest of the silicon film may be etched away or essentially removed to allow light to pass through. Polycrystalline silicon may sometimes be used in displays requiring higher TFT performance. However, amorphous silicon-based TFTs are the most common technology due to its lower production cost. The silicon layer for the TFT-LCD is typically deposited over a glass substrate by using a plasma-enhanced chemical vapor deposition process.

Figure 2A:
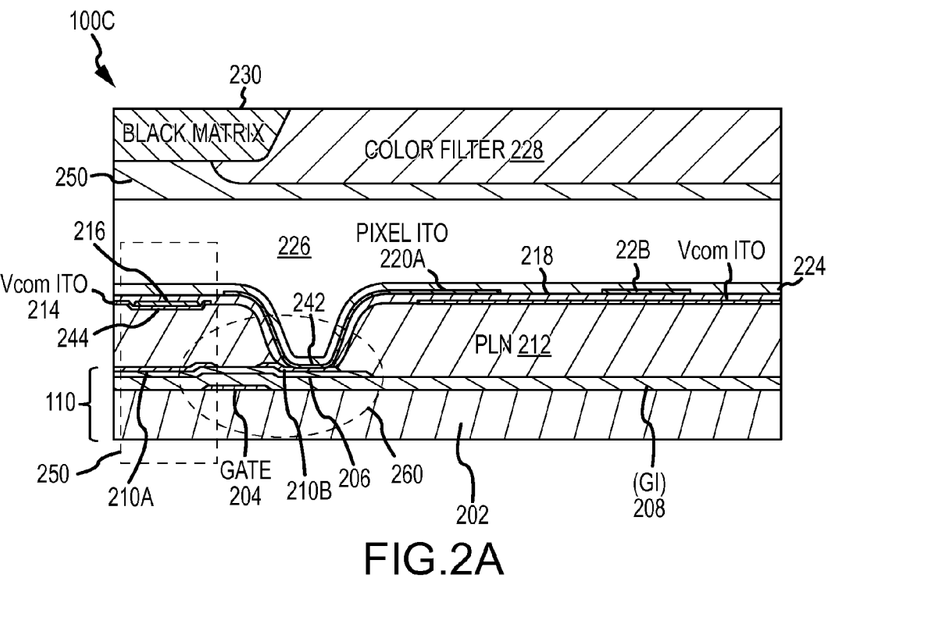
FIG. 2A illustrates a detailed cross-sectional view of an LCD portion of the sample electronic device of FIG. 1A and taken along line 2-2 of FIG. 1A, in accordance with embodiments of the present disclosure.

FIG. 2A illustrates a detailed cross-sectional view of an LCD portion of FIG. 2A in accordance with embodiments of the present disclosure. An LCD portion 100C includes a TFT glass 110, which includes a substrate 202, a gate electrode 204 over the substrate 202, and a gate insulator (GI) 208 over the gate electrode 204. The gate insulator 208 may be formed of an inorganic insulation film including silicon nitride (SiNx), silicon oxide ($SiO_2$), a dielectric oxide film such as aluminum oxide ($Al_2O_3$), an organic material, and the like. The gate insulator 304 may be formed by a chemical vapor deposition (CVD) method using a plasma enhanced chemical vapor deposition system or formed by a physical vapor method using a sputtering system. Other deposition processes may also or alternatively be used. The gate electrode is formed in a first metal layer. The gate electrode may include copper (Cu), aluminum (Al), or a combination of these metals.

The TFT glass 110 also includes a channel 206 disposed over the gate insulator 208 above the gate electrode 204. The channel layer 206 includes a semiconductor, such as silicon, or indium-gallium-zinc oxide (IGZO), zinc oxide (ZnO), indium oxide (InO), gallium oxide (GaO), tin oxide (SnO2), indium gallium oxide (IGO), indium zinc oxide (IZO), zinc tin oxide (ZTO), and indium zinc tin oxide (IZTO).

The TFT glass 110 further includes a source electrode 210A and a drain electrode 210B disposed over the channel 206. The source/drain electrodes 210A-B are also formed in a second metal layer. The source and drain electrodes may include or be formed of copper (Cu), aluminum (Al), gold (Au), silver (Ag), other suitable metals, and the like, or a combination of these materials.

The LCD portion 100C also includes a planarization (PLN) layer (organic insulation layer 212) disposed over the source/drain electrodes 210A-B and channel 206 of a TFT 240 within a circled region 260. Note that TFT glass 110 includes an array of TFTs 240 for all pixels. Each pixel may include a few TFTs. The PLN 212 includes a through-hole 242 above the drain electrode 210B. This through-hole allows a pixel electrode 220 to connect to the drain electrode.

The PLN 212 provides a flat surface for forming more layers, such as a common electrode 308 and a pixel electrode 318, among others. The planarization layer 212 may be formed from a photoactive compound (PAC) among other suitable materials. The PLN 212 includes a trench 244 on a top surface where a first conductive layer 214 is disposed over the PLN 212. This first conductive layer 214 is also referred to a "common electrode" since it is generally an electrode shared by all pixels. A third metal layer 216 is disposed over the first conductive layer 214 in the trench region 244 and may reduce the resistance of the common electrode 214. A second conductive layer 218, also referred to as a "pixel electrode," is disposed over the PLN 212 in the through-hole 242 such that the second conductive layer 220 is connected to the drain layer 210B. The second conductive layer 220 is separated from the first conductive layer 214 by a passivation layer 218. The second conductive layer 220 also may be patterned to form one or more pixel electrodes, such that each pixel electrode 220A is separated from a neighboring pixel electrode 220B by the passivation layer 218. The first conductive layer 214 and second conductive layer 220 may include, but not limited to, indium-tin oxide (ITO) among others. The passivation layer 218 may be formed of a dielectric material, such as silicon nitride (g-SiNx) or silicon oxide ($SiO_2$).

Many embodiments may experience a parasitic coupling between the common electrode 214 and the pixel electrode 220. If such a coupling exists, the PLN 212 may help reduce the parasitic coupling between the common electrode and the pixel electrode which is connected to the data line. Such parasitic coupling is often referred to a "CD coupling." The magnitude of the CD coupling depends upon the capacitance between the common electrode and the data line, is proportional to the dielectric constant of the PLN 212, and is inversely proportional to the thickness of the PLN. Thus, a thick PLN 212 helps reduce the parasitic coupling.

The LCD portion 100C further includes a polymer layer 224 disposed over the pixel electrode 220 and the passivation layer 218. The polymer layer 224 may include a polyimide (PI). Liquid molecules 226 are disposed over the polyimide layer, and are aligned on the polymer layer 224. The LCD portion 100C also includes a polymer layer, also referred to an overcoat 250 may be disposed over the liquid crystal layer 226. The overcoat 250 may include PI. The LCD portion 100C generally also includes one or more color filters 228 and may also have a black matrix 230 disposed over the overcoat 250. The black matrix 230 separates one color filter emitting a first wavelength from another color filter emitting a second wavelength. For example, the color filters 228 include red filter, green filter, and blue filter, which are separated by the black matrix 230 to avoid color mixing. The black matrix 230 includes light absorbing materials.

The TFT 240 within the circle region 260 is formed near each crossing point between the gate line and the data line to control the switching of the data voltage supplied from the data line.

Figure 2B:
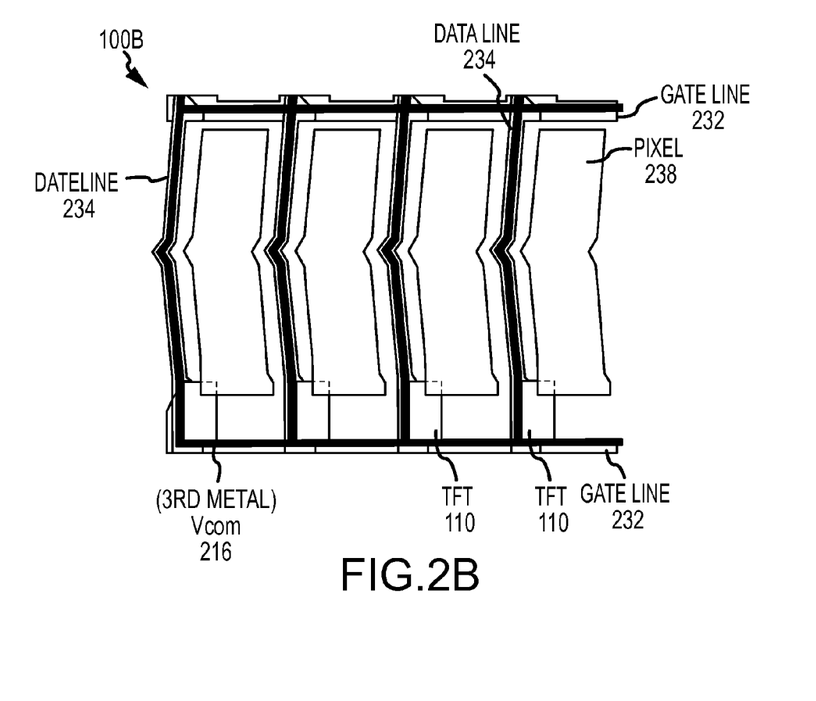
FIG. 2B illustrates a plan view of the mesh structure of a third metal in the LCD in accordance with embodiments of the present disclosure.

FIG. 2B illustrates a plan view of the mesh structure of a third metal in LCD in accordance with embodiments of the present disclosure. LCD 100B includes a number of pixel regions 238, which are the optically active areas of the display. Each pixel region 238 is defined by two substantially parallel gate line 232 and two substantially parallel data lines 234. The gate lines are substantially perpendicular to the data lines. In this embodiment, the gate line 232 is oriented in a horizontal orientation, while the data line 234 is oriented in a vertical orientation. It will be appreciated that the orientation of gate lines and data lines may vary in other embodiments.

Third metal layer 216, which generally forms a common electrode for all pixels, has a mesh structure, and overlaps with both the gate lines 232 and the data lines 234. LCD 100B also includes a number of TFTs 240 as shown in the circled region 260 of FIG. 2A. Each pixel region 238 has a respective TFT near it, typically near a corner. Each TFT is coupled to the data line 234 and gate line 232. Specifically, the pixel electrode 220 as shown in FIG. 2A is coupled to the data line 238 shown in FIG. 2B, while the gate electrode 204 as shown in FIG. 2A is coupled to the gate line 232 shown in FIG. 2B. The third metal may include or be formed of copper (Cu), aluminum (Al), molybdenum (Mo), titanium (Ti), and tungsten (W), other suitable metals, conductive ceramics, polymers and the like.

Figure 3A:
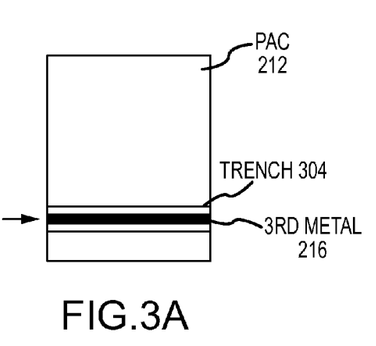
FIG. 3A illustrates an enlarged top view of a third metal positioned in a trench of an organic insulation layer in accordance with embodiments of the present disclosure.
Figure 3B:
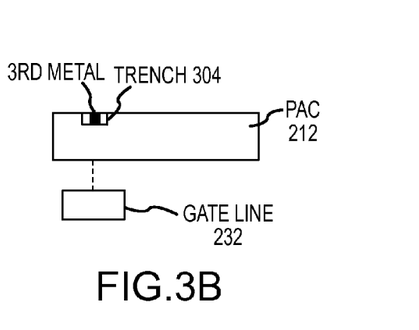
FIG. 3B illustrates a side view of the third metal in the trench of the organic insulation layer overlapping a gate line.

FIG. 3A illustrates an enlarged top view of a third metal positioned in a trench formed in an organic insulation layer in accordance with embodiments of the present disclosure. As shown, a trench 304 is formed in an organic insulator layer 212. A third metal 306 is disposed within the trench 304 such that the third metal does not protrude above the top surface of the organic insulation layer 212. FIG. 3B illustrates a side view of a gate line underlying the third metal positioned in the trench of the organic insulation layer of FIG. 3A. There may be other layers positioned between the gate line and the organic insulation layer. As shown, the trench 304 overlaps a region of gate line 232 in this embodiment.

Figure 3C:
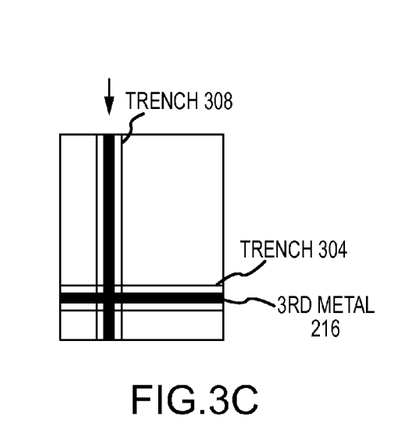
FIG. 3C illustrates an enlarged top view of a third metal in two trenches of an organic insulation layer in accordance with embodiments of the present disclosure.
Figure 3D:
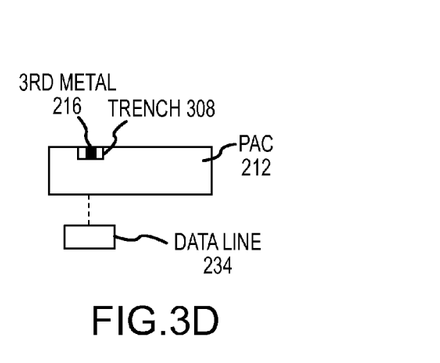
FIG. 3D illustrates a side view of a data line underyling the third metal in one of the trenches of the organic insulation layer of FIG. 3A.

FIG. 3C illustrates an enlarged top view of a third metal positioned in two separate trenches of an organic insulation layer in accordance with embodiments of the present disclosure. As shown, trenches 304 and 308 are formed in an organic insulator layer 212. The trench 304 overlaps a region of a gate line (not shown) while the trench 308 overlaps a region of a data line (not shown). The gate line and the data line are substantially perpendicular. Third metal 216 is deposited within the trenches 304 and 308. FIG. 3D illustrates a side view of a data line 234 overlapping with third metal 216 in the trench 308 of the organic insulation layer of FIG. 3A. There may be other layers between the data line and the organic insulation layer. As shown, third metal 216 is disposed within the trench 308 such that the third metal 216 does not exceed the top surface of the organic insulation layer 212.

Trenches in the organic insulation layer may be formed by various methods. FIGS. 4A-4D are simplified figures that show greater detail of the region within a rectangle region 250, the trench 244 in FIG. 2A. Additionally, FIGS. 4A-4D show multiple trenches corresponding to different gate lines and/or data lines. The use of multiple trenches is illustrative only and not meant to depict a particular number of trenches to which any embodiment is limited.

Figure 4A:
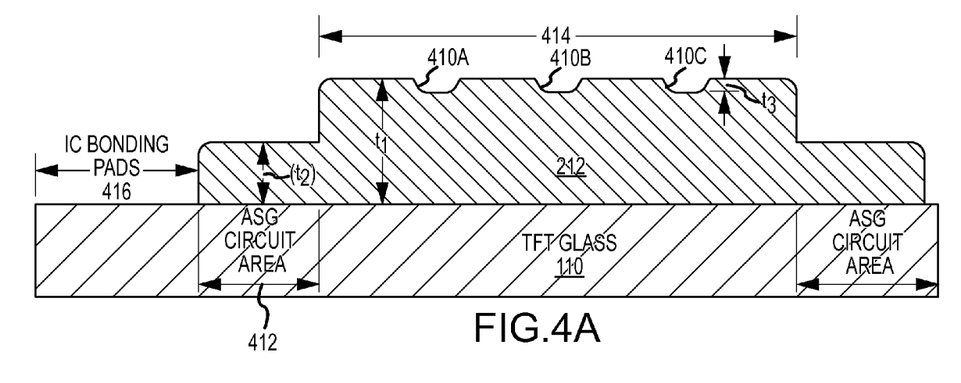
FIG. 4A illustrates a cross-sectional view of a display pixel having trenches formed in an organic insulation layer of LCD in accordance with embodiments of the present disclosure.

FIG. 4A illustrates a cross-sectional view of a display pixel having trenches formed in an organic insulation layer in accordance with embodiments of the present disclosure. As shown, an organic insulation layer 212 is disposed over a TFT glass 110. Next to the organic insulation layer 212 is an IC bonding pad region 416 located above the TFT glass 110. As shown and with respect to this embodiment, the organic insulation layer 110 has three different thicknesses. A first thickness is defined by an organic insulation layer 110 thickness $t_1$. A second thickness is defined by a side area thickness $t_2$, and a third thickness is defined by a trench depth $t_3$ for trenches 410A, 410B, 410C on top of the PAC. Generally, trench depth $t_3$ depends upon the intended thickness of the third metal. In the amorphous silicon gate (ASG) circuit area 412, the organic insulation layer has a reduced thickness $t_2$ compared to the thickness $t_1$ in the display area 414. In a particular embodiment, the second thickness $t_2$ is about half of the first thickness $t_1$. As shown, the organic insulation layer 212 has a reduced thickness on both sides (i.e. ASG circuit area 412) of the display region 414. When the organic insulation layer is formed with three regions of different thicknesses, the strain level of an edge sealing region, such as the ASG circuit area or IC bonding pad area, is significantly reduced. Note that trenches 410A, 410B and 410C have the same trench depth for different data lines in this embodiment, although the trench depths may vary in other embodiments. For example, the trenches overlapping the data lines may have different depths than the trenches overlapping gate lines. The trenches 410A, 410B and 410C overlap either respective gate lines or respective data lines.

The trench depth depends upon the intended thickness of the third metal. For example, the trench depth is at least equal or greater than the thickness of the third metal layer. In a particular embodiment, the trench depth may vary between about 0% and about 50% of the thickness of the organic insulation layer. With respect to the trench in which the third metal is deposited, the thickness of the third metal may increase to be above the limit of the conventional LCD (e.g. typically 100 Å to 10,000 Å). With the trench, the thickness can be increased without any limit such that the rubbing process does nor produce rubbing mura by a roller impacting the third metal.

As a result of increasing the thickness of the third metal, $V_{com}$ resistance decreases. $V_{com}$ resistance can decrease dramatically for a thicker third metal. For example, when the thickness of the third metal, such as copper, is changed from 700 Å to 2400 Å, the $V_{com}$ resistance is decreased from 7.5Ω to 2.5Ω.

Figure 4B:
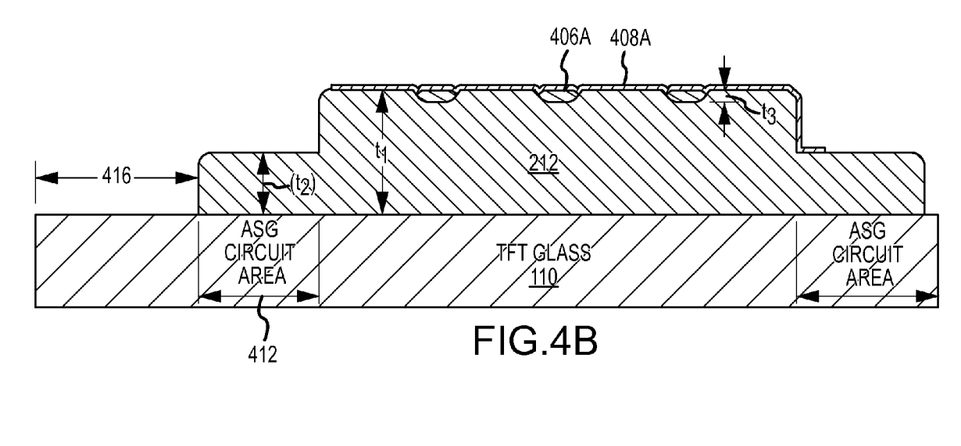
FIG. 4B illustrates a cross-sectional view of a display pixel having a third metal deposited in the trenches of FIG. 4A and an overlying transparent conductive layer in one embodiment.

FIG. 4B illustrates a cross-sectional view of a display pixel having a third metal deposited in the trenches 410A, 410B, and 410C of FIG. 4A and an overlying transparent conductive layer. Generally, these layers are deposited after the trenches are formed, and thus the cross-section shown in FIG. 4B corresponds to later manufacturing operations than that shown in FIG. 4A. As shown, third metal 406A is disposed in the trench 410, and a transparent conductive layer 408A is disposed over the third metal 406A and extend beyond the trench 410 region to be over the organic insulation layer 212.

Figure 4C:
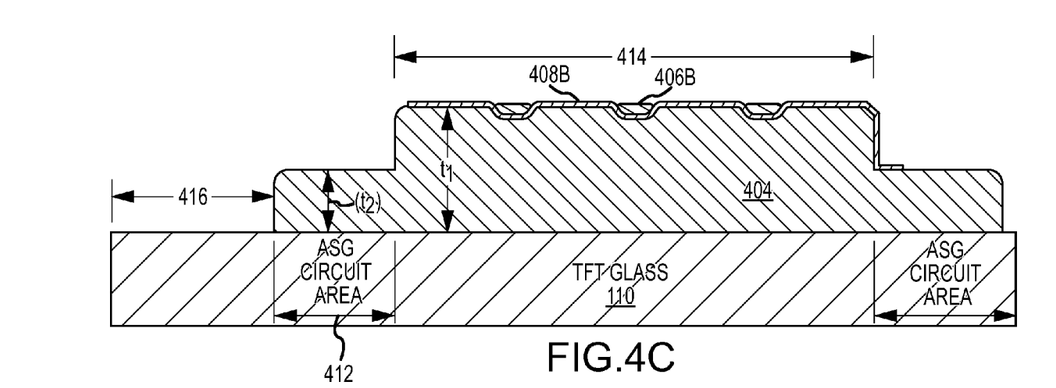
FIG. 4C illustrates a cross-sectional view of a display pixel having a transparent conductive layer and a third metal in the trenches of FIG. 4A in another embodiment.

FIG. 4C illustrates a cross-sectional view of a display pixel having a transparent conductive layer and a third metal deposited in the trenches of FIG. 4A in another embodiment. Generally, these layers are deposited after the trenches are formed, and thus the cross-section shown in FIG. 4C corresponds to later manufacturing operations than that shown in FIG. 4A. In this embodiment, a transparent conductive layer 408B is disposed over the trenches 410 and the third metal 406B is disposed over the transparent conductive layer 408B in the trench region. This embodiment switches the order of the third metal and the transparent conductive layer compared to the embodiment shown in FIG. 4B.

Figure 4D:
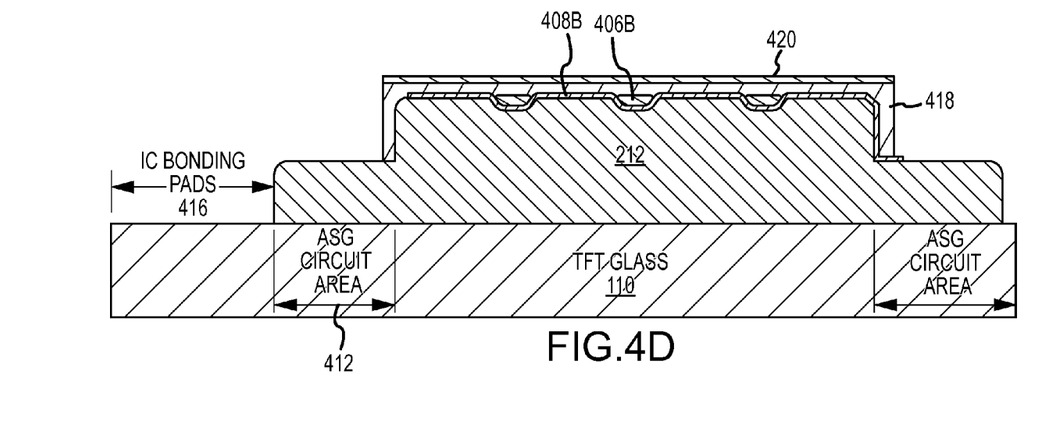
FIG. 4D illustrates a cross-sectional view of a display pixel having a passivation layer and polymer layer over the third metal of FIG. 4C.

FIG. 4D illustrates a cross-sectional view of a display pixel having a passivation layer and polymer layer over the third metal of FIG. 4C. Generally, these layers are deposited after the trenches are formed, and thus the cross-section shown in FIG. 4D corresponds to later manufacturing operations than that shown in FIG. 4C. After the deposition of the third metal layer 406B, a passivation layer 418 is disposed over the third metal layer 406B and the transparent conductive layer 408B. A polymer layer 420, such as polyimide, is disposed over the passivation layer 418. Liquid molecules are aligned on the polymer layer 420 by the rubbing process as described earlier.

Trenches 410 for the third metal 406 may be formed by at least one half tone mask (HTM) or a half tone mask with a slit metal pattern. A metal slit pattern may be added to the HTM to form several trench depths/layer thicknesses, such as $t_1$, $t_2$ and $t_3$, as described earlier, in the organic insulation layer. For example, the HTM may be used with a photoactive compound (PAC) to create the trenches and/or vary the thicknesses of the insulation layer. The metal slit pattern may further block the light completely by using a solid metal because the metal is opaque. The metal slit pattern may partially block the light because light may pass through the slit or gaps of the slit pattern. When the PAC is exposed to light, depending upon the type of the PAC, either an unexposed portion or an exposed portion may be removed by dissolving in a developer solution such that a trench is formed on the top of the PAC. The removed portion varies with the light intensity. The trench depth increases with the light intensity level.

Figure 4E:
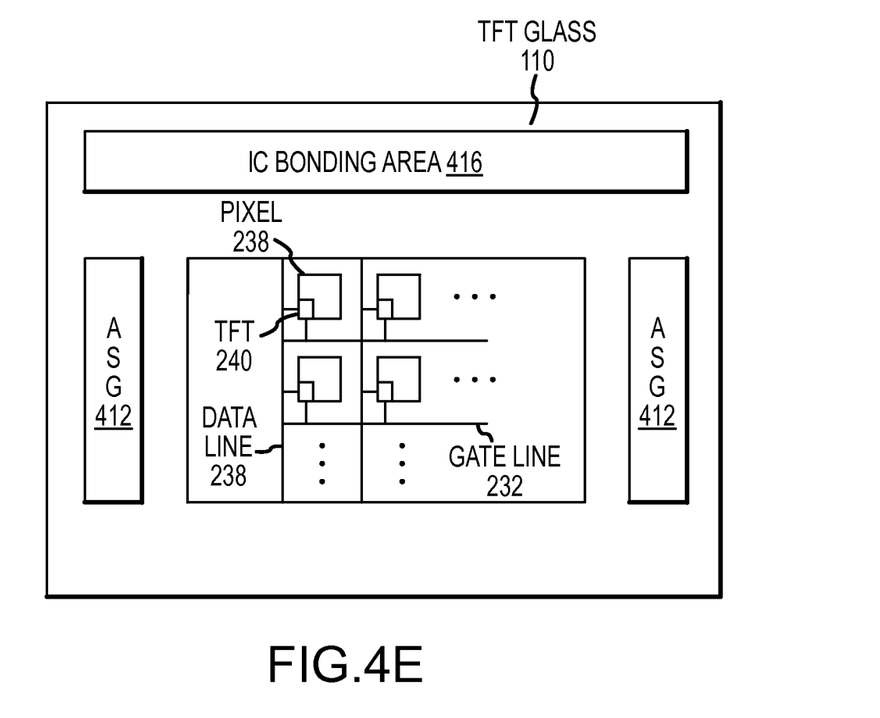
FIG. 4E shows a top view of the LCD of FIG. 4D.

FIG. 4E shows a top view of FIG. 4D. As shown, on top of a TFT glass, a display region 200 includes pixel regions 238 and TFTs, gate lines 232 and data lines 238. Additionally, on top of the TFT glass 110, the ASG circuit area 412 and the IC bonding area 416 are outside the display region 200. Reduced thicknesses by the edge of the PAC, such as above the ASG circuit area 412 may help reduce strain level of the edge sealing region.

Figure 5:
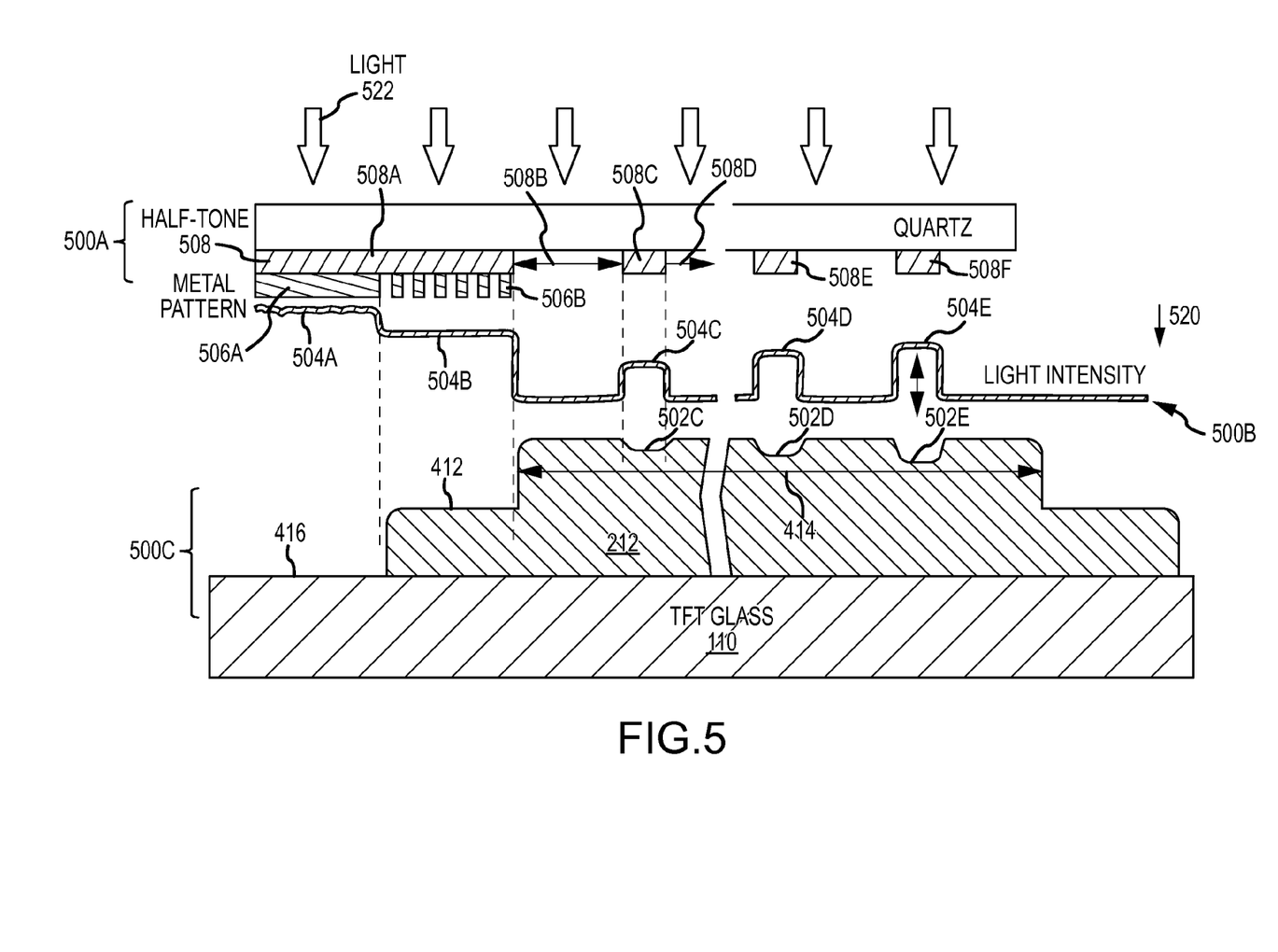
FIG. 5 illustrates how to produce an organic insulation layer with three different thicknesses for a display pixel of an LCD in accordance with embodiments of the present disclosure.

Examples are provided to illustrate the process for forming trenches in an organic insulation layer for the display region and for forming thinner portion in the ASG region outside the display area, and the IC bonding region beyond the ASG region. FIG. 5 illustrates how to produce an organic insulation layer with three different thicknesses in accordance with embodiments of the present disclosure. A top portion 500A illustrates that light 522, illustrated as downward-pointing arrows, is transmitted through a transparent substrate 510. The light then may partially pass through a half tone mask 508 with a metal slit pattern 506, or may be completely blocked. The half tone mask provides a partially exposed resist layer that may be subsequently developed. The half tone mask thickness depends upon the degree of exposure or the degree of lack of exposure of the resist layer, which depends upon whether the resist layer includes a positive resist material or a negative resist material. The metal is opaque, so that light is blocked. The slit pattern allows some light to pass through the gaps. The transparent substrate 510 includes a transparent material, such as quartz, and transmits light. Transmitted light is shown by a light intensity curve 500B. With respect to the intensity curve 500B, higher values are denoted by the curve approaching the surface of the TFT glass 110 and the PAC 212, while lower light intensities are shown by portions of the curve 500B nearer the mask 500A, as downward direction 520 shows. Curve 500B shows the intensity of light transmitted by the half-tone mask along with the metal slit pattern 506 including a solid metal portion 506A and a slit pattern 506B. FIG. 5 has a bottom portion 500C that has a PAC 212 is disposed over a TFT glass 110. The PAC 212 includes several trenches 502C, 502D, and 502E formed on the top of the PAC 212. The PAC 212 also includes a thinner portion 412 outside the display area 414, and in an amorphous silicon gate (ASG) area 412. As can be seen in FIG. 5, PAC 212 does not cover a region 416 that is above the TFT glass 110. This region 416 is outside the ASG area 412.

The half tone mask 508 includes a first light exposing area 508B, and a second light exposing area 508D. The half tone mask 508 also includes a first light blocking area 508A which is on a first side of the first light exposing area 508B. The half tone mask 508 further includes a second light blocking area 508C on a second side of the light exposing area 508B. Next to the second light blocking area 508C is the second light exposing area 508D. Additional change in transmitted light intensity may be achieved by the metal slit pattern 506. The metal slip pattern 506 may be attached to the portion 508A to increase the light blocking. The metal slit pattern 506 may include a solid metal portion 506A and a slit pattern portion 506B. The slit pattern may include chromium or other materials. The slit portion 506B allows some light to pass through while the solid metal portion 506A blocks the light completely such that transmitted light intensity level 504A is lower than light intensity level 504B (as seen in the downward direction 520).

The second light blocking area 508C may vary in the light intensity transmitted. For example, the second light blocking area 508C may be replaced by a third light blocking area 508E or a fourth light blocking area 508F to transmit light of different intensities, which result in different trench depths. In one embodiment, the PAC has the same trench depth for all trenches. Alternatively, the PAC may have trenches with different depths.

As shown in FIG. 5, the lowest intensity level 504A as seen in the downward direction 520 corresponding to the solid metal portion 506A result in completely removal of the PAC portion, 416. In this case, the light intensity is completely blocked by the metal portion 506A or the transmitted light intensity is nearly zero as seen in downward direction 520 as the light 522. The second lowest intensity level 504B corresponding to the slit pattern 506B results in the second most removal of the PAC 412, which is nearly half of the thickness in this example. Another three other intensity levels 504C, 504D, and 504E decrease as seen in the downward direction 520, which correspond to three different trench depths 502C, 502D and 502E, respectively, where the trench depth 502C is the lowest and the trench 504E is the highest among the three trench depths 502C, 502D, and 502E.

It will be appreciated by those skilled in the art that methods for forming trench may vary. Several half tone masks may be used for form trenches of different depths or reduced thickness in the PAC. For example, in one embodiment, trenches on the PAC may have the same depth. In this embodiment, a first half tone mask may be used to form a first trench depth 502C, and a second half tone mask may be used to remove a portion of the organic insulation layer 212 above the ASG circuit area 412.

In an alternative embodiment, trenches on the PAC may have different depths. In this embodiment, a first half tone mask may be used to form a first trench depth 502C, and a second half tone mask may be used to remove a portion of the organic insulation layer 212 above the ASG circuit area 412. A third half tone mask may be used to form a second trench depth 502D, and a fourth half tone mask may be used to form a third trench depth 502E.

Reducing resistance of the common electrode 214 by increasing the thickness of the third metal helps reduce the resistive-capacitive (RC) delay time of the common electrode voltage $V_{com}$, which helps the common electrode voltage recover to its original value quickly. The present disclosure provides design and methods to increase the thickness of the third metal without producing mura during the rolling process. Therefore, the stability of the common electrode voltage is improved while the defects if the display, such as mura caused by adding the third metal, is not present.

Having described several embodiments, it will be recognized by those skilled in the art that various modifications, alternative constructions, and equivalents may be used without departing from the spirit of the disclosure. Additionally, a number of well-known processes and elements have not been described in order to avoid unnecessarily obscuring the embodiments disclosed herein. Accordingly, the above description should not be taken as limiting the scope of the document.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method of fabricating a liquid crystal display having a array of pixels, the method comprising:
   depositing an organic insulation layer over a thin film transistor (TFT) substrate comprising a plurality of TFTs to control the array of pixels, the TFT substrate comprising a first metal layer to form a gate electrode and a second metal layer to form a source electrode and a drain electrode for each of the plurality of TFTs;
   forming a plurality of trenches in the organic insulation layer by using a half tone mask;
   depositing a third metal layer over the organic insulation in the trenches, the trenches being configured to have a trench depth at least equal to a thickness of the third metal layer;
   disposing a passivation layer over the third metal layer;
   forming a pixel electrode for each pixel over the passivation layer, the pixel electrode being connected to the drain electrode;
   disposing a polymer layer over the pixel electrode; and
   aligning liquid molecules on the polymer layer.

2. The method of claim 1, the step of depositing a third metal layer over the organic insulation layer in the trenches further comprising depositing a first conductive layer over the organic insulation layer to form a common electrode for the array of pixels; and depositing the third metal layer over the first conductive layer above the trenches.

3. The method of claim 1, the step of depositing a third metal layer over the organic insulation layer in the trenches further comprising depositing the third metal layer over the organic insulation layer in the trenches; and depositing a first conductive layer over the third metal and the organic insulation layer to form a common electrode for the array of pixels.

4. The method of claim 1, wherein the third metal layer comprises a mesh structure, the array of pixels being defined by gate lines and data lines of the LCD.

5. The method of claim 4, wherein the mesh structure is configured to overlap with the gate lines and data lines of the LCD.

6. The method of claim 4, wherein the gate lines are coupled to the gate electrodes of the TFTs for the array of pixels.

7. The method of claim 4, wherein the data lines is coupled to the pixel electrode for each pixel.

8. The method of claim 1, wherein the third metal layer is configured to overlap with gate lines of the LCD.

9. The method of claim 8, wherein the gate lines are coupled to the TFTs for the array of pixels.

10. The method of claim 8, wherein the gate lines are coupled to the gate electrode of the TFT for each pixel.

11. The method of claim 1, wherein the polymer layer comprises polyimide.

12. The method of claim 1, wherein the organic insulation layer comprises a photoactive compound.

13. The method of claim 1, wherein the trench depth is at least equal to or greater than 10,000 .ANG.

14. A liquid crystal display (LCD), the LCD comprising:
   an array of pixels over a thin film transistor (TFT) substrate, the TFT substrate comprising a plurality of TFTs for the array of pixels, each TFT having a first metal layer to form a gate electrode and a second metal layer to form a source electrode and a drain electrode for each pixel;
   an organic insulation layer disposed over the TFT substrate, the organic insulator layer having a plurality of trenches on a top surface;
   a third metal layer disposed over the organic insulation layer in the trenches, the trenches having a trench depth at least equal to the thickness of the third metal layer;
   a passivation layer over the third metal layer;
   a pixel electrode for each pixel over the passivation layer, the pixel electrode being coupled to the drain electrode;
   a polymer layer over the pixel electrode; and
   liquid molecules on the polymer layer.

15. The LCD of claim 14, wherein a first conductive layer is over the organic insulation layer to form a common electrode for the array of pixels, and the third metal layer is over the first conductive layer above the trenches.

16. The LCD of claim 14, wherein the third metal layer is over the organic insulation layer in the trenches; and a first conductive layer is over the third metal and the organic insulation layer to form a common electrode for the array of pixels.

17. The LCD of claim 14, wherein the third metal layer comprises a mesh structure, the array of pixels being defined by gate lines and data lines of the LCD.

18. The LCD of claim 17, wherein the mesh structure is configured to overlap with the gate lines and data lines of the LCD, the gate lines are coupled to the gate electrodes of the TFTs for the array of pixels, and the data lines is coupled to the pixel electrode for each pixel.

19. The LCD of claim 14, wherein the third metal layer is configured to overlap with gate lines of the LCD, and the gate lines are coupled to the gate electrodes of the TFTs for the array of pixels.

20. The LCD of claim 14, wherein the polymer layer comprises polyimide.

21. The LCD of claim 14, wherein the organic insulation layer comprises a photoactive compound.

22. The LCD of claim 14, wherein the trench depth is at least equal to or greater than 10,000 .ANG.

* * * * *